United States Patent [19]

Yuan et al.

[11] 4,283,425

[45] Aug. 11, 1981

[54] PROCESS FOR PREPARING LOW FAT CONTENT POTATO CHIPS AND PRODUCT THEREOF

[75] Inventors: Mary W. Yuan, Tarrytown; Sharon R. Birney, Yorktown Heights, both of N.Y.

[73] Assignee: General Foods Corporation, White Plains, N.Y.

[21] Appl. No.: 151,212

[22] Filed: May 19, 1980

[51] Int. Cl.³ .............................................. A23L 1/216
[52] U.S. Cl. .................................... 426/102; 426/242; 426/303; 426/637; 426/656; 426/657; 426/804; 426/808
[58] Field of Search ............... 426/102, 241, 242, 243, 426/302, 303, 305, 637, 804, 808, 656, 657

[56] References Cited

U.S. PATENT DOCUMENTS

| 3,163,546 | 12/1964 | Pader | 426/637 |
|---|---|---|---|
| 3,365,301 | 1/1968 | Lipoma et al. | 426/242 |
| 3,650,776 | 3/1972 | Tschirgi | 426/102 |
| 3,754,931 | 8/1973 | Waitman et al. | 426/102 |
| 4,109,020 | 8/1978 | Gorfien et al. | 426/241 |

*Primary Examiner*—Arthur L. Corbin
*Attorney, Agent, or Firm*—Howard J. Newby; Thomas A. Marcoux; Bruno Struzzi

[57] ABSTRACT

A potato chip having an added fat content of up to about 10% is prepared by coating the raw potato slice with globular protein, applying a layer of edible oil on top of the protein coating and subjecting the raw coated slice to microwave heating.

6 Claims, No Drawings

PROCESS FOR PREPARING LOW FAT CONTENT POTATO CHIPS AND PRODUCT THEREOF

BACKGROUND OF THE INVENTION

1. Field of the Invention

This invention relates to potato chips. More particularly, it relates to potato chips having a low fat content. This invention especially relates to low fat content potato chips prepared by microwave heating.

2. Description of the Prior Art

In the conventional production of potato chips, raw or blanched potato slices are deep fat fried to yield the final edible potato chip. The effect of frying on the potato slices is to reduce the water content (fresh potatoes contain approximately 85% moisture) with consequent oil uptake and to produce surface color and crispness. The finished potato chips contain from 30–45% oil or fat based on the total weight of the potato chip and less than 5% moisture. (As used herein all percentages are expressed in weight unless stated to the contrary and the term "fat" is to be understood to include both edible fats and oils.) This high fat content is undesirable for many reasons. For example, it increases the total caloric content of the potato chip making such a product objectionable to persons wishing to lose weight or to avoid weight gain. The deep fat frying process also shortens the shelf stability of the potato chip. Moreover, the frying process is difficult to control and often results in excessively cooked potato chips. A low fat content chip cannot be made with deep fat frying processes and the fat content cannot be controlled as fat is absorbed throughout the frying operation.

Potato chips having a fat content below 30–45% have been prepared heretofore. U.S. Pat. No. 3,402,049 of Mancuso et al. discloses a method of producing potato chips having an edible oil or fat content of from about 20 to about 30%. Deep fat frying is not employed by Mancuso et al. to obtain this lower fat content. The raw potato slices are soaked in an edible fat at a temperature below the gelatinization temperature of potato starch, removed from the fat, drained and heated in an oven or by forced air drying at temperatures of 225°–350° F. until the desired degree of browning is achieved.

Oil uptake is also reduced in a process disclosed in British Pat. No. 1,034,035 where reductions in oil content of 10–20% are obtained. Here, the potato slices are removed from the deep fat fryer when their water content is still relatively high (5–20%) and then dried by a heating process without further oil uptake. The heating completes the required water extraction and the necessary degree of browning and may be achieved by a combination of hot air drying followed by microwave heating. The first drying stage is relatively slow and the second is relatively fast. Oil uptake is reported as 10–20% less than in the conventional frying process. Others have reported that microwave drying of partially deep fried potato chips resulted in oil contents of about 32–38% compared to 38–44% for those which were finished fried in the conventional manner (Davis & Smith, "Microwave Processing of Potato Chips" 72,86–88, *Potato Chipper* (November, 1965).

Heating or drying of potato chips has been achieved heretofore by a variety of procedures. Hot air drying is disclosed in U.S. Pat. No. 3,402,049 and British Pat. No. 1,034,035 (discussed above) as well as in U.S. Pat. No. 3,044,880 of Bogyo et al., while radiant heat drying to remove water from potato chips is disclosed in U.S. Pat. No. 3,353,962 of Smith, Jr.

Microwave heating is a relatively new procedure employed in the production of potato chips. British Pat. No. 1,034,035 discloses microwave drying for the removal of some of the water from partially deep fried potato chips. U.S. Pat. No. 3,365,301 of Lipoma et al. discloses the use of microwave heating to supplement the cooking of potato slices. Here, raw potato slices are deep fried to the desired oil content but short of any substantial color change and then the desired moisture content and degree of crispness is obtained by exposure of the partially cooked chips to microwave energy. This procedure of partially frying the potato slices and completing the process in a microwave oven, as well as the commercial use of this procedure, is discussed in Talburt and Smith, "Potato Processing," 287–290 (The Avi Publishing Company, Inc. 1967).

The combination of a deep fat fryer and a microwave oven for the cooking of foodstuffs is disclosed in U.S. Pat. No. 2,997,566 to Pierce et al. The deep fryer is provided with an external source of heating to heat and maintain the cooking fat at temperature. The microwave energy cooks the foodstuff while the cooking fat browns the exterior of the foodstuff to provide the desired surface finishing and sealing. It has been suggested that this combination apparatus may provide very low fat absorption (Copson, "Microwave Heating," 375 (The Avi Publishing Company, Inc. 1962)). Copson also suggests the substitution of a non-toxic, flavorless resin, such as a silicone, for the cooking fat or oil in the combination deep fat fryer-microwave oven to provide "fat-free" deep fat frying. However, the elimination of the reservoir of liquid cooking medium within the microwave oven has not been suggested by either Pierce et al. or Copson.

Microwave heating is employed as one of the steps in a process of producing dehydrated french fried potatoes disclosed in U.S. Pat. No. 3,881,028 to Capossela, Jr. et al. Prior to deep fat frying, the potatoes are subjected to microwave heating which causes a minimal water loss of 2.5–3.0% but, more importantly, causes a degree of gelatinization throughout the potato piece which is critical in producing the dehydrated french fried product. However, although dehydration is effected in the deep frying and a final heating stage, reducing the water content more than 3% by microwave heating prior to deep fat frying is said to produce an unduly hard and dry french fry because of excessive starch gelatinization.

Heretofore, neither low fat potato chips nor conventional potato chips have been produced by a process which eliminates completely immersion frying of the potato pieces and utilizes a single step of heating by microwaves to remove water and produce a crispy product having the uniform color and taste of deep fried potato chips.

It is an object of this invention to provide potato chips by a process which eliminates deep fat frying.

It is another object of this invention to provide potato chips having a fat content significantly lower than that obtained heretofore by commercial processes.

It is still another object of this invention to provide potato chips by a process which utilizes microwave heating as the sole means of reducing the water content of the potato piece to the required level and providing the color, crispness and flavor of deep fried potato chips.

SUMMARY OF THE INVENTION

In accordance with the present invention, it has been found that a low fat potato chip can be prepared in a microwave oven without deep fat frying. More particularly, this invention is directed to a process of preparing a potato product having a low fat content which comprises:

(a) coating raw potato slices with globular protein;

(b) microwave heating the coated potato slices for a period of time sufficient to produce a product having substantially the same flavor, color and crispness as deep fat fried potato chips and an added fat content of 0 to less than about 10%.

This invention is also directed to the potato product produced by this process.

In addition, this invention relates to a potato product comprising:

A slice of potato coated with a layer of globular protein, said coated slice having been subjected to microwave heating for a sufficient period of time to produce a composition having substantially the same flavor, color and crispness as deep fat fried potato chips and an added fat content of 0 to less than about 10%.

DESCRIPTION OF THE PREFERRED EMBODIMENTS

The present invention relates to low fat potato chips. The potato product produced by the process of this invention has a fat content of 0 to less than about 10% which is lower than the 30-45% fat content of conventional deep fat fried potato chips. It is also significantly lower than those which are partially deep fried and then dried in a microwave oven to obtain an oil content some 10-20% less than the conventional product. Not only is the oil content of the potato chips prepared by the process of the present invention significantly reduced but the caloric content of these potato chips is also 30-50% less than the conventional product. By coating the raw potato slices with globular protein and subjecting the coated slices to microwave heating for a sufficient period of time, a product is obtained which surprisingly has the color and appearance of conventional potato chips as well as the crispness and flavor of the conventional product.

The reason why this process is able to produce a product so surprisingly similar to conventionally produced potato chips is not known. Since hot air oven processing of protein coated slices of raw potato does not yield a comparable product, it is thought that the combination of protein coating and microwave heating is essential to produce a low fat product which is so similar to deep fat fried potato chips. Apparently, the protein forms a translucent film which provides the chips with a slightly greasy appearance coupled with a fairly homogeneous texture and color. Further, the protein enables desirable air pockets to form on the surface of the potato slices during microwave heating.

In practicing this invention, potatoes are washed, peeled, sliced and water-washed as heretofore. Optionally, the slices may be soaked in a dilute (e.g., 0.1%) aqueous solution of sodium meta bisulfite or tetrabutyl hydroquinone for 15-60 minutes, followed by washing with cold water to remove residual quantities of the sulfite or the hydroquinone. The sulfite has been used heretofore as a bleaching agent while the hydroquinone reacts with the sugar in the potato to avoid the dark color such sugar often produces in the finished potato chip.

The varieties of potatoes preferred for deep fat fried potato chips, i.e., Kennebec, Nordchip, Oneida, Monona, Tobique and the like, may be employed in this invention. Other varieties whose sugar contents have made them undesirable as "chipping" potatoes may nonetheless be employed satisfactorily in this invention. These poor "chipping" potatoes have high reducing sugar contents, 0.5-1.0% glucose and higher. This sugar reacts during frying to form an undesirable dark brown color in the finished potato chip. As the moisture decreases below about 6-8% during deep fat frying, the rate of browning is accelerated if reducing sugars are present in the potato and an unsatisfactory product is often produced because of the dark brown color. However, in the microwave heating process of this invention, excessive browning is not obtained even with the high glucose varieties. Thus, such "non-chipping" varieties as Irish Cobblers, and the like may be usefully employed in practicing this invention.

After the potato slices are water washed, the excess water is removed by, for example, blotting dry with paper toweling or draining and exposure to a stream of warm air. All of the slices are then coated with a layer of protein before being subjected to microwave heating. The protein is most easily applied in the form of a liquid. The useful proteins are soluble in either water, dilute salt solutions or both. The proteins may be either animal or vegetable in nature and belong to the general class known as globular proteins. The albumins, globulins and histones provide the source of proteins which are useful in this invention. Such proteins as egg albumen, sodium caseinate and soy protein (known as soy isolate) have been used satisfactorily. Soy isolate is especially useful, particularly in the form of a dilute NaCl solution of soy isolate. A salt concentration of 1-5, particularly 2-4% and a soy isolate concentration of 5-15, particularly 5-10% are satisfactory.

The protein solution may be applied to the outer surface of the individual slices by a variety of techniques. A satisfactory coating is obtained by soaking the slices in the solution and then draining off the excess solution. Spraying the solution onto the slices is also satisfactory provided the slices are turned so as to obtain a coating on all surfaces. Other techniques, such as dipping and the like, may also be employed.

The protein coated raw potato slices are processed into low fat potato chips by microwave heating. This is accomplished by placing the coated slices in a microwave oven and subjecting them to microwave heating. Microwave ovens which are commercially available for home as well as industrial use may be employed. These ovens operate at a frequency of hundreds and thousands of megahertz. Those operating at 910-915 MHz have proven satisfactory in this invention, although units operating in the 2400-2500 MHz range can also be used. Microwave heating times of about 5-15 minutes, usually about 6-9 minutes normally, produce a satisfactory potato chip. The proper period of time can be readily determined by one skilled in this art from several test runs. Such variables as the variety of potato, the thickness of the individual potato slices, the nature of the protein employed, and the quantity of the coating will effect the time required for the microwave heating to dehydrate the slices and provide the required degree of crispness and light brown color.

Although the practice of this invention usually involves the preparation of potato chips from raw potato slices, it may also be practiced with lyophilized potato slices. After the raw potato slices are prepared and, optionally, subjected to a sodium meta bisulfite treatment as described hereinbefore, they are freeze dried to reduce their water content. Following this, the slices are processed by the practice of the subject invention in a fashion similar to that described for the raw potato slices.

The product produced by microwave heating of the protein coated potato slices has the appearance of deep fried potato chips and possesses the taste and crispness of the more conventional product. The protein coating on the finished product produces a translucent, slightly greasy appearance. The protein coating also causes air pockets to form on the surface of the potato slice. Both effect are similar to that observed with conventional potato chips.

In an optional embodiment of this process, a thin coating of oil may be applied over the protein coating before the slices are placed in the microwave oven. This may be accomplished, for example, by dipping the protein-coated slice in a quantity of edible oil or by spraying edible oil onto the surface of the protein coating. The term edible oil as used herein includes edible fats. Specific examples of useful edible oils include olive oil, peanut oil, corn oil, coconut oil, refined cottonseed oil, soybean oil, sesame oil and the like as well as mixtures thereof. In a variation of this embodiment, the protein coated slices may be slightly heat treated by, for example, microwave heating, so as to heat set the protein coating before the oil coating is applied. Whether the protein coating is heat set or not, following the application of the thin oil coating, the potato slices are subject to microwave heating, as described hereinabove, to obtain the necessary degree of water removal as well as the desired crispness and uniform light brown color.

The potato chips prepared by the process of this invention are a low fat, low caloric product. Their added fat content is 0 to less than about 10% and preferably is about 3-5% when oil is applied over the protein coating. The caloic level of these potato chips is about 30-50% less than the caloric content of deep fried potato chips. The moisture content of the potato chips of this invention is similar to that of the conventionally prepared product, i.e., less than about 5%, usually about 2-3%.

The following examples illustrate embodiments of this invention.

EXAMPLES I

Fresh, raw potatoes were peeled, sliced, water washed and dried. The raw potato slices were then soaked in an aqueous solution containing about 3% sodium chloride and about 5% of a soy isolate, available commercially under the tradename Promine D. After removal from the solution, the slices were drained and divided into two groups. Group I was placed in a microwave oven operating at 910-915 MHz for a total cooking time of up to 12 minutes. The quality of these slices was evaluated after 6, 8, 10 and 12 minutes of microwave heating. Group II was placed in a household-type oven operating at 500° F. The slices were cooked in the oven for about 4 minutes or until they were browned.

The oven prepared chips browned unevenly while those from the microwave oven were of a uniform light brown color. The microwave prepared chips had an appearance similar to potato chips prepared by deep fat frying in that the surface texture, shine and presence of air pockets were similar to the conventionally prepared product.

EXAMPLE II

The effect of a surface coating of protein on raw or lyophilized potato slices to inhibit oil uptake during microwave heating was evaluated.

Raw, fresh potatoes were peeled, sliced to a thickness of 0.04" and shaped to a diameter of 1½ or 2", water washed and dried. Some of the raw slices were treated with a 0.1% aqueous solution of sodium bisulfite for 30 minutes, water washed to remove residual quantities of bisulfite and blotted dry with paper towels.

Another group of the raw slices were lyophilized and served as freeze dried potato slices. Following the freeze drying, these slices were treated with bisulfite in the same fashion as the raw potato slices.

Both the raw and the freeze dried slices were evaluated by each of the following procedures:

(1) Potato slice dipped in oil and microwave heated to a light brown color.

(2) Potato slice coated with protein, dipped in oil and microwave heated to a light brown color.

(3) Potato slice coated with protein, heat set by microwave heating, dipped in oil and microwave heated to a light brown color.

The slices were coated with protein by dipping in a 10% aqueous solution of soy isolate (Promine D) in a fashion similar to that of Example I.

The oil uptake of the slices was measured quantitatively before and after each treatment. The following spectrophotometric assay was employed to measure oil uptake:

An oil soluble dye, (oil) Red (Sigma), was used as the marker for oil uptake and its maximum absorption wavelength was determined to be at 510 nm using hexane as the solvent. A 0.1% (w/w) dye/oil solution was made followed by filtration on Whatman #12 filter paper to get rid of undissolved dye. A standard curve was constructed from known weights of colored oil dissolved in 50 ml hexane and the O.D.'s were read at 510 nm. The correlation with the same amount of oil absorbed on potato slices is shown in Table I below.

TABLE I

CORRELATION OF KNOWN WEIGHTS OF COLORED OIL EXTRACTED FROM RAW POTATO SLICES

| gm Oil Weighed & Extracted in Hexane | | O.D. (510 nm) |
| --- | --- | --- |
| Standard | 0 | 0 |
| " | .125 | .095 |
| " | .250 | .189 |
| " | .500 | .449 |
| " | .750 | .640 |
| " | 1.000 | .858 |
| Raw Potato Slices | 0 | .031 |
| Raw Potato Slices | .125 | .112 |
| Raw Potato Slices | .250 | .239 |
| Raw Potato Slices | .500 | .443 |
| Raw Potato Slices | .750 | .617 |
| Raw Potato Slices | 1.000 | .800 |

Raw potato slices are presented in Table II, below: those for the freeze-dried potato slices in Table III, below.

TABLE II

EFFECT OF SOY ISOLATE ON OIL UPTAKE OF RAW POTATO SLICES BEFORE AND AFTER HEAT TREATMENT

| | Oil Uptake - gm. Oil Uptake/ 10 gms. Raw Slices | |
| --- | --- | --- |
| Type of Surface Coating | Before Microwave Heating | After Microwave Heating |
| No Protein Coating; oil | .63 | .42 |
| 10% Protein; oil | .14 | .22 |
| 10% Protein; heat set; oil | .31 | .40 |

TABLE III

EFFECT OF SOY ISOLATE ON OIL UPTAKE OF FREEZE-DRIED POTATO SLICES BEFORE AND AFTER HEAT TREATMENT

| | Oil Uptake - gm. Oil Uptake/ 2 gms. lyophilized slices | |
| --- | --- | --- |
| Type of Surface Coating | Before Microwave Heating | After Microwave Heating |
| No Protein Coating; oil | .57 | .32 |
| 10% Protein; oil | .21 | .09 |
| 10% Protein; heat set; oil | .29 | .21 |

These data show that protein coating inhibits oil uptake whether or not the protein coating is heat set. Further, the heat set protein coating does not inhibit oil uptake to the extent that is achieved by the protein coating which is not heat set.

What is claimed is:

1. A process of preparing a potato product having a low fat content which comprises:
   (a) coating raw potato slices with globular protein,
   (b) applying a layer of edible oil on top of the protein coating, and then
   (c) microwave heating the coated potato slices for a period of time sufficient to produce a product having substantially the same flavor, color and crispness as deep fat fried potato chips and having an added fat content of up to about 10%.

2. A process according to claim 1 wherein the added fat content of said product is about 3-5%.

3. A process according to claim 1 wherein the layer of edible oil is applied by dipping the protein coated slices in edible oil or spraying the edible oil onto the protein coated slices.

4. A process according to claim 1 including the additional step of subjecting the protein coated slices to a heat treatment effective to heat set the protein coating before applying the layer of edible oil on top of the protein coating.

5. A potato product prepared by the process of claim 1.

6. A potato product prepared by the process of claim 4.

* * * * *